(No Model.)
A. MOLER.
TREE CULTIVATOR.
No. 509,544. Patented Nov. 28, 1893.
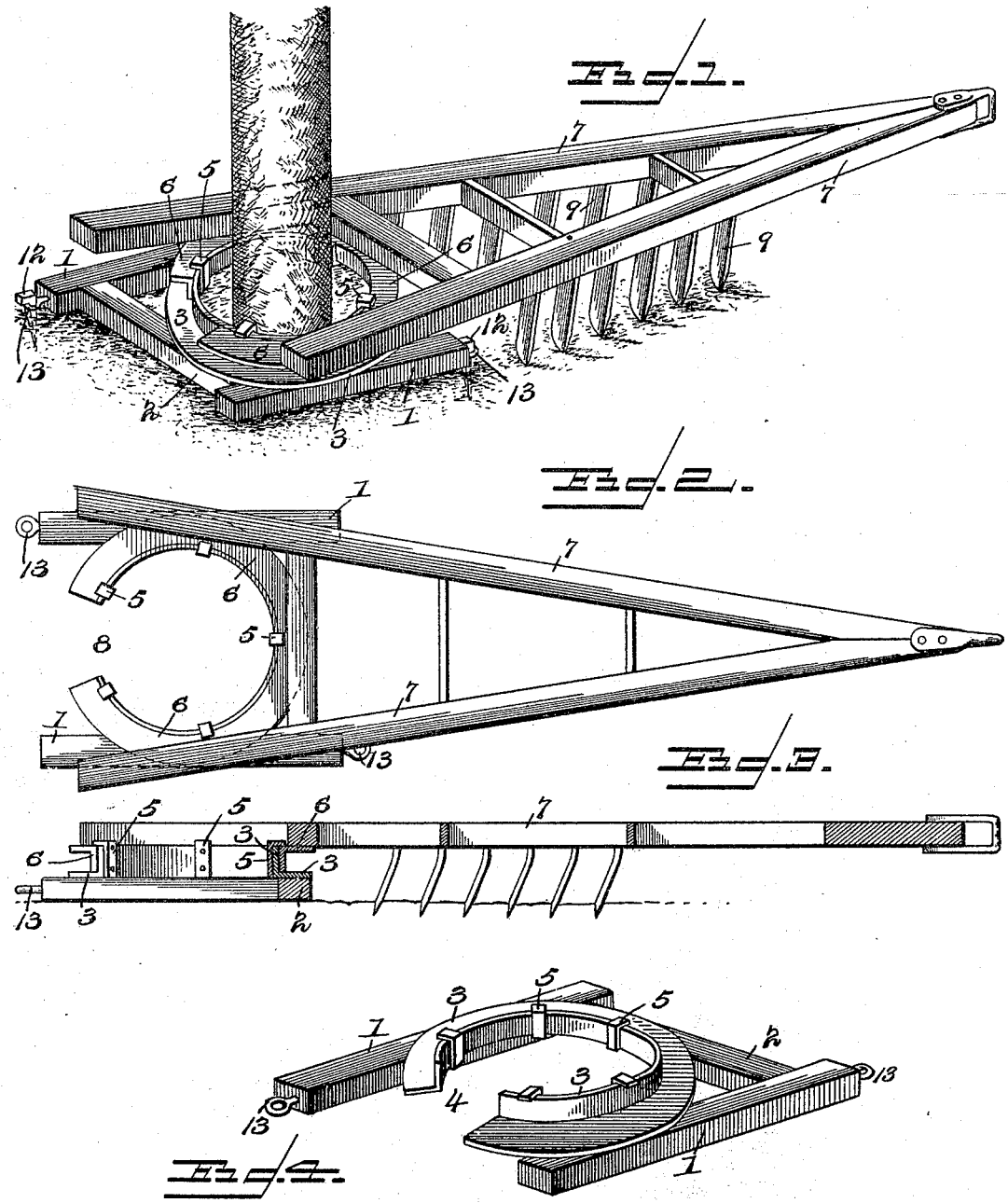
Inventor
Asa Moler,
Witnesses
E. H. Stewart,
W. S. Duvall
By his Attorneys.
C. A. Snow & Co.

UNITED STATES PATENT OFFICE.

ASA MOLER, OF IOWA CITY, IOWA.

TREE-CULTIVATOR.

SPECIFICATION forming part of Letters Patent No. 509,544, dated November 28, 1893.

Application filed July 7, 1893. Serial No. 479,840. (No model.)

*To all whom it may concern:*

Be it known that I, ASA MOLER, a citizen of the United States, residing at Iowa City, in the county of Johnson and State of Iowa, have invented a new and useful Tree-Cultivator, of which the following is a specification.

My invention relates to improvements in tree cultivators; the objects in view being to provide a simple construction of cultivator designed to be applied to the base or trunk of a tree, to be secured in position therearound and adapted to be revolved about said trunk, and containing harrow or cultivating-devices, to grub and thoroughly stir up and loosen the soil about the tree.

With these and other objects in view the invention consists in certain features of construction hereinafter specified and particularly pointed out in the claims.

Referring to the drawings:—Figure 1 is a perspective view of my invention in position. Fig. 2 is a detail in plan of the same. Fig. 3 is a vertical longitudinal sectional view. Fig. 4 is a detail in perspective of a stationary base.

Like numerals of reference indicate like parts in all the figures of the drawings.

In the practice of my invention I employ an anchoring-frame, the same being substantially of U-shape and therefore consisting of the opposite side-bars 1, and a transverse connecting-bar 2, at one end thereof, so that as will be apparent, one side of the frame is open. This frame is surmounted by a segment 3 of a ring, or in other words, the ring is open at one side, as at 4, to correspond with the opening in the base. The ring in cross-section is L-shaped and is provided at intervals with clips 5 which extend outward at their upper ends and overlap the upper edges of the ring.

Mounted pivotally and adapted to revolve upon the ring 3 is a movable ring 6, the same being in cross-section of inverted L-shape and overlapped by the upper outwardly bent ends of the said clips 5. This movable ring 6 is surmounted by a pair of converging beams 7 which lie at opposite sides of an opening 8 with which the ring is provided and which corresponds to the openings 4 in the lower ring and in the base. These beams 7 converge toward their outer ends and combine to form a sweep, which is provided at its outer end with a clevis to which may be connected the usual draft-appliances. The beams are secured together rigidly through the medium of intermediate braces, and upon their under sides have secured thereto in any suitable manner cultivator-teeth 9. If desired these teeth may be omitted and the sweep connected with any suitable drag-harrow, but I preferably employ the teeth shown and apply them directly to the beam.

This completes the construction of the device and the operation thereof may be briefly stated as follows: The sweep is moved around until the opening in the ring 6 corresponds to or registers with the opening 4 in the lower ring 3, and the two rings are introduced around the trunk of the tree to be cultivated, and anchoring-stakes 12 are driven down through rings 13, with which the diagonally opposite corners of the base-ring are provided. It now simply remains to revolve the sweep and the cultivator teeth will operate upon the soil surrounding the tree, thoroughly pulverizing and loosening the same. When the soil surrounding one tree has been loosened or cultivated the team is stopped at a point whereby the opening 8 of the revolving ring is opposite the opening 4 of the stationary ring and the team driven to the next tree, where the operation is repeated.

I do not limit my invention to the precise details of construction herein shown and described, but hold that I may vary the same to any degree and extent within the knowledge of the skilled mechanic.

Having described my invention, what I claim is—

1. In a cultivator of the class described, the combination with the rectangular base, open at one side, and adapted to be anchored to the ground, and the stationary ring having an opening at one side corresponding with that of the base and surmounting said base, of a revoluble ring mounted on the stationary ring and having an opening corresponding therewith, and a sweep provided with cultivator teeth secured to said revoluble ring, substantially as specified.

2. In a cultivator of the class described, the combination with the rectangular base, open at one side, and the ring L-shaped in cross section and having an opening at one side corresponding to the opening therein and provided upon its inner vertical portion with a series of radiating clips, of a ring mounted revolubly upon the stationary ring and of inverted L-shape and embraced by the clips and provided at one side with an opening corresponding to that of the stationary ring, and a cultivator operating sweep mounted on said revolving ring, substantially as specified.

3. In a cultivator of the class described, the combination with the rectangular base, open at one side, and a ring L-shaped in cross-section and having an opening at one side corresponding to the opening therein and provided upon its inner vertical portion with a series of radiating clips, of a ring mounted revolubly upon the stationary ring and of inverted L-shape and embraced by the clips and provided at one side with an opening corresponding to that of the stationary ring, a pair of beams surmounting the revoluble ring and diverged at their rear ends to conform to the opening therein and having their front ends converged and provided with a clevis, suitable braces between the beams, and cultivator teeth upon the under side thereof, substantially as specified.

In testimony that I claim the foregoing as my own I have hereto affixed my signature in the presence of two witnesses.

ASA MOLER.

Witnesses:
E. B. JOHNS,
G. A. BENNER.